United States Patent [19]

Porter et al.

[11] Patent Number: 4,731,159

[45] Date of Patent: Mar. 15, 1988

[54] EVAPORATOR

[75] Inventors: John E. Porter, Newcastle-upon-Tyne; Colin Ramshaw, Norley, both of England

[73] Assignee: Imperial Chemical Industries plc, London, England

[21] Appl. No.: 811,330

[22] Filed: Dec. 19, 1985

Related U.S. Application Data

[63] Continuation of Ser. No. 580,137, Feb. 14, 1984, abandoned.

[30] Foreign Application Priority Data

Mar. 1, 1983 [GB] United Kingdom ................ 8305595

[51] Int. Cl.$^4$ ............................................. B01D 1/22
[52] U.S. Cl. .................... 159/6.1; 159/13.1; 159/28.6; 159/DIG. 32; 159/49; 202/235; 202/236; 202/238; 203/89; 165/88
[58] Field of Search .......... 202/236, 235, 238, 267 R; 203/89, 86; 159/5, 6.1, 13.1, 23, 49, 28.6, DIG. 32; 165/92, 86, 88

[56] References Cited

U.S. PATENT DOCUMENTS

| | | | |
|---|---|---|---|
| 3,110,646 | 11/1963 | Mayhew et al. | 202/236 |
| 3,200,051 | 8/1965 | Silvern | 202/238 |
| 3,206,381 | 9/1965 | Neugebauer et al. | 202/236 |
| 3,271,271 | 9/1966 | Watt | 202/236 |
| 3,291,704 | 12/1966 | Diedrich et al. | 202/236 |
| 3,385,770 | 5/1968 | Roe et al. | 202/236 |
| 3,430,690 | 3/1969 | Sciaux | 165/88 |
| 3,640,330 | 2/1972 | Javet | 159/6.1 |
| 3,664,928 | 5/1972 | Roberts | 202/236 |
| 4,283,250 | 8/1981 | Abrahamson et al. | 202/236 |
| 4,586,985 | 5/1986 | Ciocca et al. | 159/6.1 |
| 4,597,835 | 7/1986 | Moss | 202/236 |
| 4,627,890 | 12/1986 | Porter et al. | 159/23 |

FOREIGN PATENT DOCUMENTS

| | | | |
|---|---|---|---|
| 0080328 | 6/1983 | European Pat. Off. | |
| 0162578 | 11/1985 | European Pat. Off. | 165/86 |
| 2200905 | 7/1973 | Fed. Rep. of Germany | 202/238 |
| 0598531 | 2/1948 | United Kingdom | |
| 0614388 | 12/1948 | United Kingdom | |
| 0757149 | 9/1956 | United Kingdom | 202/236 |
| 0854371 | 11/1960 | United Kingdom | 165/86 |
| 1042386 | 9/1966 | United Kingdom | |
| 1132640 | 11/1968 | United Kingdom | |

Primary Examiner—S. Leon Bashore
Assistant Examiner—V. Manoharan
Attorney, Agent, or Firm—Cushman, Darby & Cushman

[57] ABSTRACT

An evaporator comprises a plurality of substantially parallel plates mounted for rotation about a common axis and in which provision is made for a condensible vapor to flow across a first face of each of said plates and for a liquid, at least a portion of which is to be evaporated, to flow across the second face of each of said plate, which plates are arranged to be rotatable at such a mean acceleration, measured in a radial direction with respect to said axis of rotation, greater than the acceleration due to gravity, said first face of each of said plates has a surface designed to discourage formation of a continuous liquid film thereon. The evaporator may be used to concentrate solutions, e.g. of depleted brine or aqueous caustic soda.

7 Claims, 8 Drawing Figures

EVAPORATOR

This is a continuation of application Ser. No. 580,137, filed Feb. 14, 1984, which was abandoned upon the filing hereof.

The present invention is an improved evaporator, more specifically a centrifugal apparatus for this purpose.

Within manufacturing industry it is frequently desired to convert a liquid into vapor form. For example a liquid feedstock may be required to enter a reaction in the vapor phase; or liquid components of a mixture may be separated or purified by distillation; or a solution may be concentrated by removing a proportion of the solvent by evaporation therefrom. For these diverse purposes, a range of equipment has been developed over many years. Most of such equipment is of a stationary type but more recently, for some applications, rotary evaporators of different types have been proposed or used.

Thus an article by K C D Hickman et al in "Advances in Chemistry Series" No. 27, pages 128-46 (1960) described the so-called "Hickman Still", which was designed and operated to study its possible use for the distillation of brackish and saline waters. The inferior yield achieved by that apparatus as compared with that theoretically achievable was attributed by the authors to a number of possible factors.

Another rotary device is the so-called CentriTherm ultra-short-time evaporator, which has been offered by the firm Alfa-Laval for the treatment of heat-sensitive liquids. In that evaporator, the heat transfer is from steam across the thickness of conical discs in a nested stack.

Our object in devising the present invention has been to produce a rotary evaporator suitable for a wide range of applications and having a high rate of heat transfer.

According to the present invention, there is provided an evaporator which comprises a plurality of substantially parallel plates mounted for rotation about a common axis and in which provision is made for a condensible vapour to flow across a first face of each of said plates and for a liquid, at least a portion of which is to be evaporated, to flow across the second face of each of said plates, which plates are arranged to be rotatable at such a rotary speed as to subject any liquid thereon to a mean acceleration, measured in a radial direction with respect to said axis of rotation, greater than the acceleration due to gravity, said first face of each of said plates has a surface designed to discourage the formation of a continuous liquid film thereon.

Mean acceleration is defined by the equation:

$$a_m = \left(2\pi \frac{N}{60}\right)^2 \times \left(\frac{r_1^2}{2}\right)^{\frac{1}{2}}$$

where N is the rotational speed of the plates about the said axis in revolutions per minute, and $r_1$ is the distance in meters from the axis of rotation to the radially outer portion of the plates.

The evaporator of our invention may be used in general in any situation where it is desired to convert a liquid into its vapour. Thus it may be used, for example, as a rotary still for purifying a liquid product, for example saline or brackish water. The evaporator is of particular value for concentrating a solution by removing a portion of the solvent. Such solution may be a liquid dissolved in a liquid solvent, provided that the solvent is more volatile than the solute. More usually, however, the solution will be of a solid solute. Thus in one particular application, the evaporator of the present invention may be used for concentrating brine, for example so-called "depleted" brine from electrolytic cells used in the production of chlorine; in another, it may be employed to concentrate aqueous caustic soda solutions from membrane cells.

The condensible vapour which flows across the first face of each of the plates of the evaporator and by means of which heat is introduced to the system may with, advantage be steam. Alternatively it may be the vapor form of one of the commercially available or appropriate compounds or mixtures of compounds specifically offered as heat transfer fluids. Thus it may be one of the refrigerants of the chlorofluorohydrocarbon range, especially the $C_1$ to $C_2$ compounds from that range. These include Refrigerant 22, which is chlorodifluoromethane, Refrigerant 12 (dichlorodifluoromethane), Refrigerant 115 (chloropentafluoroethane) and Refrigerant 114 (dichlorotetrafluoroethane) and those refrigerants which are azeotropic mixtures of such compounds.

As already indicated, the first face of the plates which are a feature of the evaporator according to the present invention, that is the face over which the condensible vapor flows, has a surface designed to discourage the formation of a continuous liquid film thereon. Preferably the first face of the plates is treated such that (a) condensation of the condensible vapour thereon occurs in a dropwise fashion and (b) its wettability is reduced such that formation of any continuous, stable liquid film is discouraged. Such treatments include provision of a coating of inter alia a suitable silicone or polytetrafluoroethylene on the surface.

Alternatively, in order to disrupt any liquid film which otherwise would be formed, the surface of said first face of the plates may have protrusions from said surface, indentations in said surface or the plate may be corrugated. These features designed to disrupt the film, where they are present, are preferably disposed generally transversely to the radial flow of any liquid across the plate surface. More preferably, they are disposed in one or more circles which are concentric with the axis of rotation of the plates or in a continuous spiral configuration about said axis. Thus in one form, where the surface features are one or more channels in the plate surface, it is preferred that they are continuous channels disposed concentrically about said axis of rotation or a continuous spiral channel about that axis as centre.

When these features, for example corrugations, protrusions or indentations, are disposed in concentric circles or a spiral configuration, the circles or successive laps of the spiral are preferably spaced at a density, measured in a radial direction, of between 50 and 1,000 per meter, preferably more than about 100 per meter. Thus the pitch of the pattern of these surface features, that is the distance between repeated features of the pattern, is preferably between 1 mm and 20 mms, more preferably less than about 10 mms. When the surface features are channels, the depth of each channel is preferably between 0.05 and 5 mms, especially between 0.2 and 5 mms and more especially between 0.5 and 2.5 mms. Very shallow channels, for example of the order of 0.05 to 0.25 mm, may if desired be formed by etching the plate surface.

We do not exclude the possibility that in addition to modifying the profile of the plate surface, the plate surface coming into contact with the condensible vapor may be treated to reduce its wettability.

The second face of the plates, that is the face over which flows the liquid of which at least a proportion is to be evaporated, may advantageously be treated so as to assist (i.e. enhance) the retention of a continuous film of liquid thereon. Such treatment, which may be chemical, e.g. etching, or physical, e.g. sand-blasting, will in general be aimed at giving the surface an overall fine roughness.

The thickness of the plates employed in the device according to the present invention is generally between 0.5 and 5 mms, depending upon the material of construction, the specific evaporation to be carried out and the form of surface features chosen. While the thickness of the plate may vary—and obviously will vary with some forms of surface features—in general when referring to plate thickness we refer to the plate thickness as it would be without those features. The plate thickness is preferably between 0.25 and 1.5 mms, especially between 0.5 and 1.0 mm.

The outer diameter of the plates used in the evaporator of the present invention is typically in the range 10 cm to 5 meters and is preferably between about 50 cm and 100 cm and where the plates are in the form of an annulus the inner diameter thereof is typically in the range 5 cm to 1 meter.

The plurality of plates in the evaporator of the present invention are mounted substantially parallel to each other along the common axis about which they are able to rotate and are closely adjacent to one another to form narrow passages. Preferably the mean axial depth of the passages between adjacent plates is less than about 50 mms and more preferably is between 0.25 mm and 5 mm. Where the axial depth of a passage varies along the radial length thereof, for example both of the two opposing surfaces which define the passage have peaks and troughs, the troughs of the first of the said surface being aligned with the troughs of the second of the said surfaces and the peaks of the first surface being aligned with the peaks of the second surface, the narrowest gap is often about 2 mm and the largest gap is often about 8 mm.

It is indeed often preferred that the surfaces of adjacent plates, where those surfaces are both contoured, are so aligned that protrusions on one surface are aligned with protrusions on the other. In this way, a fresh spray of the liquid formed by condensation of the condensible vapor can be continuously formed since as the liquid flows through the passageway between two plates, the opposed surfaces of which have a multiplicity of contours, it is ejected from a protruding contour on one plate and deposited on a contour on the opposed surface of the adjacent plate, from a protruding contour of which it is rapidly ejected. This ejection alternates between the protruding contours of the two opposed surfaces as the liquid flows along the passageway therebetween and in this way the transfer of heat via the plates to the liquid to be vaporised is enhanced.

In a useful modification of this last-described arrangement, linear protrusions on one surface are arranged to cross similar protrusions on the other surface at a shallow angle and the protrusions on these adjacent surfaces are in contact with each other at the points of crossing.

In this way, an element of additional support is imparted to the structure as a whole and as a result it is possible to use thinner plates, thereby further improving the transfer of heat across each plate.

In general, when a plate bearing liquid upon its surface is rotated, the centrifugal effect tends to move that liquid in a direction generally away from the axis of rotation. Thus the liquid to be evaporated in the presently-described evaporator is conveniently fed to the plates at a point adjacent to their axis of rotation, for example to the centre of the plates when the latter are annular. The vapor generated may be withdrawn at a point adjacent to the radially inner edge of the plates while any liquid remaining unvaporised, for example a more concentrated solution than that fed to the evaporator, may be withdrawn from a point or points adjacent to the outer edge of the plates.

The condensible vapor, on the other hand, is conveniently fed to the outer edge of the plates so that, as it passes under pressure in a direction generally towards the axis of rotation, it flows counter-current to the liquid formed as it condenses, which latter may be collected at the outer edge of the plates.

The material of which the plates are constructed should have good thermal conductivity and should be such that each plate can withstand the stress generated during operation of the evaporator. Preferably also the material is substantially resistant to attack by or reaction with the materials with which it comes into contact in use. With these considerations in mind suitable materials include steel, aluminium, copper, nickel and titanium.

The plates, in operation, are rotated at speed as to subject any liquid thereon to a mean acceleration, measured in a radial direction with respect to the axis of rotation, greater than the acceleration due to gravity, 'g'. The particular value selected depends upon such considerations as the size of the plates, the heat flow therethrough and the desired capacity of the evaporator in terms both of total liquid throughput and of quantity of liquid to be evaporated. In general, the acceleration may lie within the range from 5 to 1000 g, especially from 50 to 750 g and more preferably from 100 to 600 g.

The invention will be further described by reference to the accompanying drawings, in which:-

Figure 1:
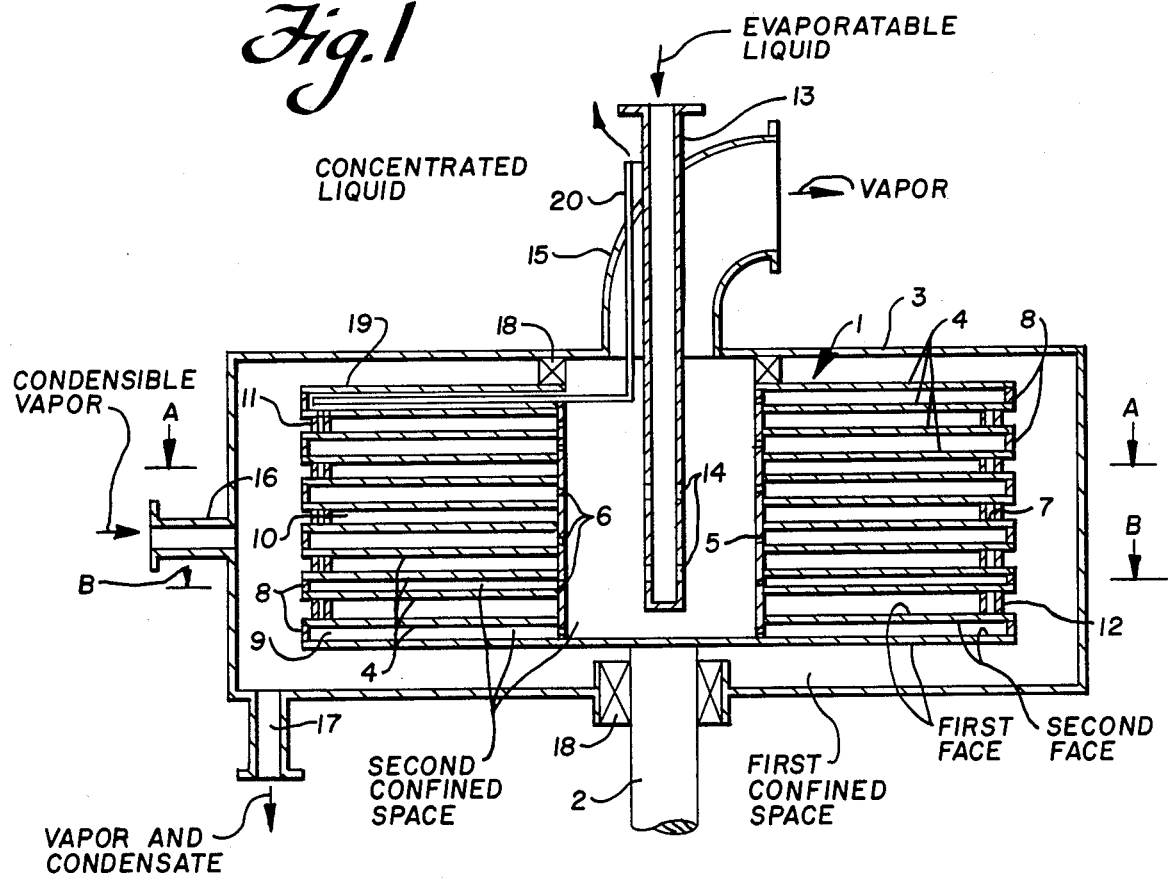
FIG. 1 illustrates, in schematic axial section, an evaporator according to the present invention.
Figure 2:
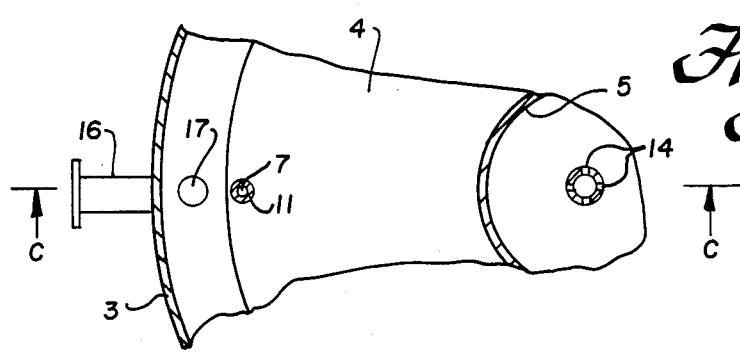
FIG. 2 is a part sectional view along the line A—A of FIG. 1.
Figure 3:
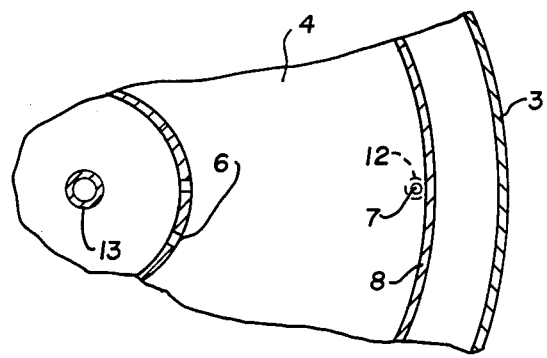
FIG. 3 is a part sectional view along the line B—B of FIG. 1.
Figure 4:
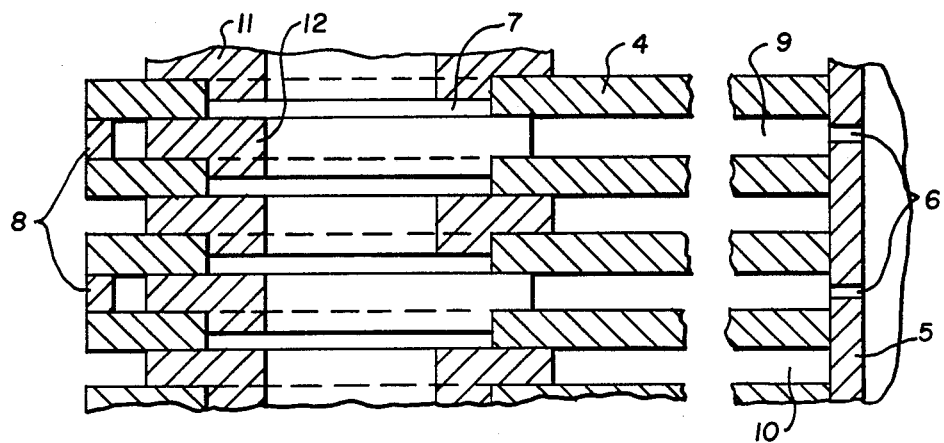
FIG. 4 is an enlarged part sectional view along the line C—C of FIG. 2.
Figure 5:
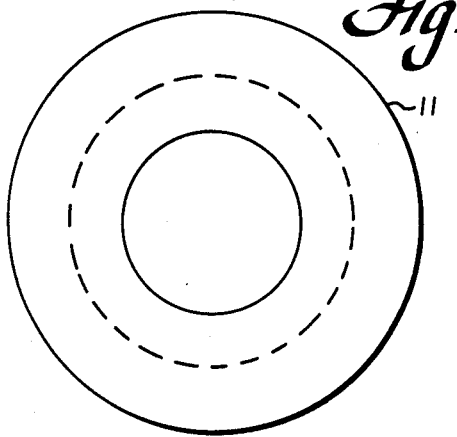
Figure 6:
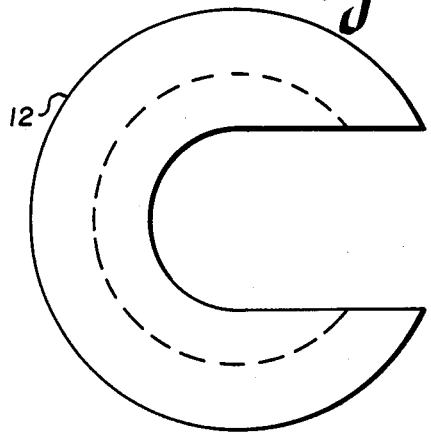
Figure 7:
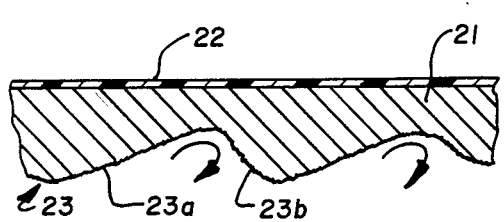
Figure 8:
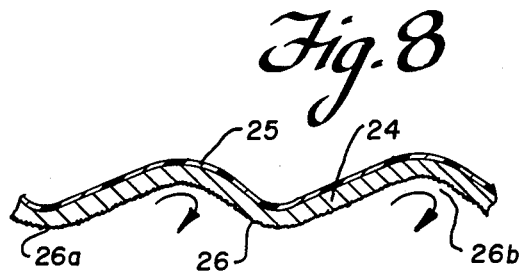

FIGS. 5 and 6 illustrate in enlarged plan view the spacers 11 and 12 respectively of FIGS. 2 to 4; and FIGS. 7 and 8 illustrate in enlarged section two forms of plate which may be incorporated in an evaporator according to the present invention.

Referring firstly to FIGS. 1 to 6 of the drawings, a rotor 1, mounted on a shaft 2 by means of which it is rotated in a housing 3, is formed from a plurality of annular plates 4 mounted on a cylindrical member 5. The member 5 is provided with ports 6 and the annular plates 4 are formed with a plurality of orifices 7, e.g. each plate 4 has six orifices disposed uniformly adjacent the outer perimeter thereof. Alternate spaces between the annular plates 4 are sealed at their outer perimeter by rims 8 to form sealed spaces 9, which are in fluid flow connection with the ports 6, and open spaces 10.

Circular washers 11 and C-washers 12 are mounted in orifices 7 to form a set of, for example six, manifolds which join the spaces 9. A liquid feed pipe 13, provided at its lower end with orifices 14, projects into the center of the rotor and is, in part, surrounded by a vapor discharge pipe 15. The housing 3 is provided with ports 16 and 17 for the entry and exit respectively of a condensible vapor. Gas-tight seals 18 allow rotation of the rotor 1 and shaft 2 within the housing 3. A stationary scoop 19, leading to a liquid discharge pipe 20 is disposed between the top two plates 4.

In operation, the rotor is rotated, a liquid to be vaporised, for example an aqueous solution of caustic soda, is fed via feed-pipe 13 and orifices 14 to impinge on the inner surface of the member 5 and moves outwards through the ports 6 into the spaces 9 where it flows under the centrifugal effect arising from rotation of the rotor, across one surface of each of the plates 4. A condensible vapour is fed into the housing through port 16 and enters the spaces 10. The vapor loses a portion of its heat, condenses to form a film which moves rapidly outwards under centrifugal force through the open spaces 10 as a thin film on one surface of each of the plates 4, and is then removed via the port 17. The heat lost by the condensible vapor vaporises a portion of the liquid in spaces 9 and the vapor so produced is discharged from the apparatus via the ports 6 and pipe 15. The concentrated solution in the spaces 9 is discharged via orifices 7 and is forced, by the pressure generated by the dynamic head of the liquid, through the stationary scoop 19 and discharge tube 20.

The plate 21 illustrated in FIG. 7 is one example of a plate suitable for use in the above described evaporator. The surface 22 of plate 21 is the surface upon which the condensible vapor condenses and in the illustrated embodiment it is flat but has a very thin film of polytetrafluoroethylene thereon. Liquid condensed on surface 22 rapidly gathers into drops, which are quickly flung from the surface by centrifugal force. The opposite surface 23 of plate 21 has a close-packed succession of channels, which may be in the form of concentric circles or successive turns of a spiral i.e. surface discontinuities disposed transversally to radial flow of liquid across the surface 23. Each of the channels has a more gently sloped side 23a nearer to the axis of rotation and a more steeply sloped side 23b nearer to the outer edge of the plate 22. The whole of surface 23 is roughened on a fine scale by sand-blasting. On rotation of plate 21, the liquid to be vaporised flows in an outward direction over surface 23 (that is, left to right as illustrated). A continuous film of liquid is maintained but within that film, a good mixing is achieved at the point where liquid on slope 23a encounters the foot of slope 23b—as indicated by the curved arrows in FIG. 7. The peak of each slope 23b, that is where liquid climbing that slope encounters the start of slope 23a, is rounded to assist retention of the film on the surface.

The plate 24 illustrated in FIG. 8 has been shaped by stamping and is corrugated. The profile of the corrugations (represented by alternating series of protrusions 26a and indentations 26b) is such that the surface 26 over which flows the liquid to be evaporated is similar to the surface 23 of FIG. 7, that is it is shaped to maintain a continuous liquid film, while encouraging (i.e. enhancing) mixing within the film as indicated. The surface 26 has been sand-blasted. The other surface 25 of plate 24 has the complementary profile to surface 26 and has been coated with polytetrafluoroethylene. This combination of profile and coating ensures that any film of liquid on surface 25 is quickly disrupted and that the liquid is rapidly thrown from the plate.

We claim:

1. An evaporator for passing an at least partially condensible vapor in indirect heat transfer relationship with an at least partially vaporizable liquid, said evaporator comprising:

housing means defining a first confined space;

a plurality of coaxially arranged, axially spaced, two-faced plates located in said housing along an axis;

rotor wall means, including axially extending, radially inner and radially outer sidewall means joining axially adjacent twos of said plates to constitute a rotor having a manifold located radially centrally of said plates and defining a second confined space enclosed by said rotor, with:

a first face of each plate openly communicated with said first confined space but isolated from open communication with said second confined space, and a second face of each plate openly communicated with said second confined space but isolated from open communication with said first confined space;

means defining a vapor inlet for an at least partially condensible vapor to said first confined space and means defining an outlet for at least partially condensed vapor from said first confined space, said inlet and said outlet being so arranged relative to one another that, in use, condensible vapor introduced to said first confined space through said vapor inlet will flow in contact with said first face of each plate, lose heat thereto and at least partially condense before leaving said first confined space through said outlet;

means defining a liquid feedstock inlet for an at least partially vaporizable liquid from externally of said housing means to said manifold of said second confined space, means defining a vapor outlet from said manifold of said second confined space to externally of said housing means, and means defining a concentrated liquid outlet from sites located between and in communication with said second faces of repsective neighboring twos of said plates radially of said manifold to externally of said housing means, said liquid feedstock inlet to said second confined space and said concentrated liquid outlet means and said vapor outlet being so arranged relative to one another that, in use, partially vaporizable liquid introduced into said second confined space through said liquid feedstock inlet will flow radially outwardly along said plates in contact with said second face of each plate, gain heat lost by said partially condensible vapor therefrom, and at least partially vaporize before leaving said housing means, respectively as concentrated liquid through said liquid outlet means and as vapor from said vapor outlet, after back-flowing radially inwardly between said plates and into said manifold;

means sealing and journalling said rotor with respect to said housing means;

means for rotating said rotor about said axis of said plurality of plates at a rotary speed which subjects liquid flowing thereon to a mean acceleration, measured radially of said axis, that is within the range of from 5 to 1000 times acceleration due to gravity; and said first face of each plate being provided with surface means for reducing formation of a continuous film of liquid condensate of said partially condensible vapor thereof.

2. The evaporator of claim 1, wherein:
said surface means provided on said first face of each plate is a coating of polytetrafluoroethylene.

3. The evaporator of claim 1, wherein:
said surface means provided on said first face of each plate is a coating.

4. The evaporator of claim 1, wherein said second face of each plate comprises a series of protrusions for enhancing mixing action in liquid flowing thereon.

5. The evaporator of claim 1, wherein:
said second face of each plate comprises a series of indentations for enhancing mixing action in liquid flowing thereon.

6. The evaporator of claim 1, wherein:
a series of corrugations is provided on said second face.

7. The evaporator of claim 1, wherein:
a series of surface discontinuities is disposed generally transversally to radial flow of liquid across said second face of each plate for enhancing mixing action in liquid flowing thereon.

* * * * *